United States Patent [19]

Wolfe et al.

[11] Patent Number: 4,989,989
[45] Date of Patent: Feb. 5, 1991

[54] HYDRAULIC SENSOR FOR QUENCH DETECTION AND LOCATION IN SUPERCONDUCTORS

[75] Inventors: William R. Wolfe, Penn Hills; James R. Logan, Hampton Twp., Allegheny County both of Pa.

[73] Assignee: Westinghouse Electric Corp., Pittsburgh, Pa.

[21] Appl. No.: 401,593

[22] Filed: Aug. 31, 1989

[51] Int. Cl.$^5$ .............................................. G01K 3/12
[52] U.S. Cl. ..................................... 374/107; 364/557; 374/24; 374/176; 374/201
[58] Field of Search .................. 73/295; 374/110, 102, 374/16, 143, 176, 24, 25, 107; 505/842, 849

[56] References Cited

U.S. PATENT DOCUMENTS

| 3,015,960 | 1/1962 | Steele | 505/842 X |
| 3,308,646 | 3/1967 | Singleton . | |
| 3,605,495 | 9/1971 | Krouse et al. | 374/143 X |
| 3,797,316 | 3/1974 | Thompson, Sr. | 374/202 |
| 3,856,513 | 12/1974 | Chen et al. | 374/176 X |
| 4,036,058 | 7/1977 | Bodker . | |
| 4,506,996 | 3/1985 | Nara | 505/847 X |
| 4,560,288 | 12/1985 | Nara . | |
| 4,566,323 | 1/1986 | Masumoto et al. | 505/842 X |
| 4,655,079 | 4/1987 | Masumoto et al. | 73/295 |
| 4,682,898 | 7/1987 | Janssen | 374/107 X |

FOREIGN PATENT DOCUMENTS 141904 2/1982 Japan .

OTHER PUBLICATIONS

"Thermal Expulsion of Helium from a Quenching Cable-In-Conduit Conductor", L. Dresner, Ninth Symposium on Engineering Problems of Fusion Research, IEEE, N.Y. 1981, pp. 618–621.

"Measuring Concn. of Non-Azeotropic Two Component Refrigerant . . . as Step Function", V. K. Dresden, 06/01/88, (Dres) Germany).

"Quench Detection by Fluid Dynamic Means in Cable-In-Conduit Superconductors", Lawrence Dresner, pp. 167–174, vol. 33, Proceedings of 1987, Cryogenic Engr. Conference, 1988.

Primary Examiner—Daniel M. Yasich

[57] ABSTRACT

The present invention provides a hydraulic sensor for quench detection and location in a superconductor, and particularly a superconductor used to form an inductor or a magnet. The sensor consists of an insulating tube (1) adjacent to and preferably co-wound with the super conductor (2) and filled with a supercooled working fluid (3). When joule heating occurs in the superconducting conductor as a result of a portion of it becoming normal, the heat is transferred directly to the corresponding portion of the adjacent tube (1). This heat causes the vapor pressure of the working fluid (3) at that point in the tube to change. This change in pressure propagates in both directions at the speed of sound in the working fluid. By detecting with sensors (6,7) when a change in pressure arrives at the ends (5,6) of the tube (1) and calculating the difference between the arrival times, not only can a quench be detected, but the exact location of the quench initiation region can be determined.

7 Claims, 1 Drawing Sheet

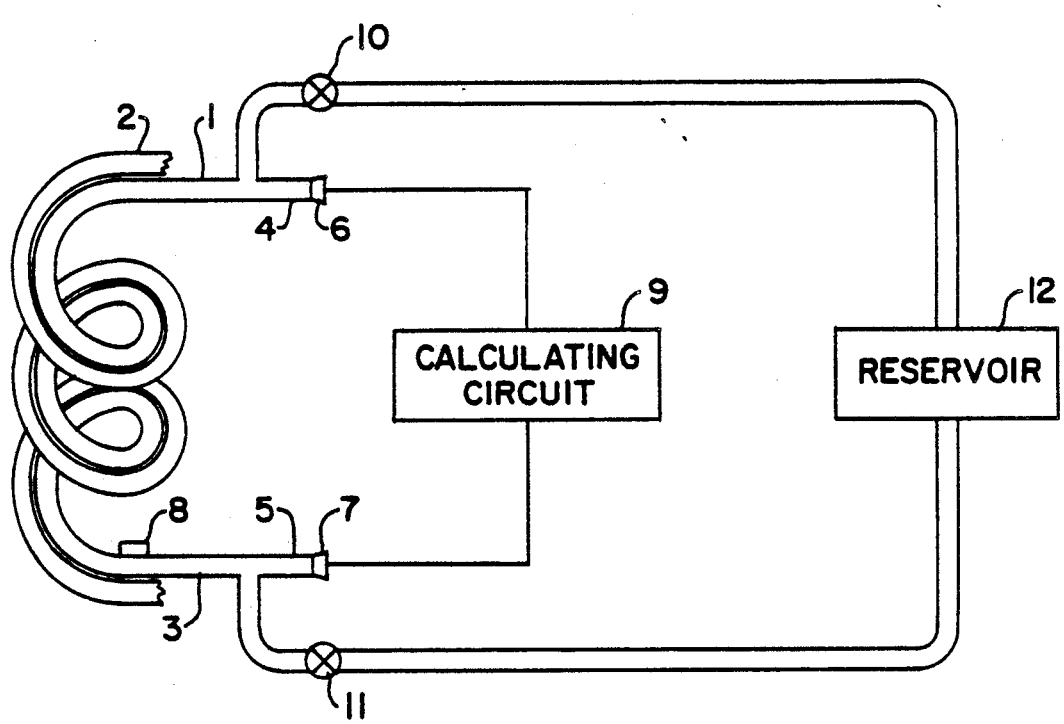

HYDRAULIC SENSOR FOR QUENCH DETECTION AND LOCATION IN SUPERCONDUCTORS

FIELD OF THE INVENTION

The present invention relates to a sensor for detecting and locating normal zones or quenches in a superconductor and more particularly to an hydraulic sensor.

BACKGROUND OF THE INVENTION

Superconducting magnets and inductors are capable of generating high magnetic fields and thereby storing large amounts of energy. Superconducting inductors are very efficient for these purposes because no energy is lost to resistive or joule heating in the superconducting current path. Every superconducting material has a critical temperature $T_c$ for a given ambient magnetic field above which the material is no longer superconducting. If a region of a superconducting material loses its superconducting property (i.e. becomes normal or quenches), joule heating occurs in the normal or nonsuperconducting region. If the region is small enough, the heat will be dissipated and the region will return to its superconducting state.

If the region is large, such that sufficient joule heating occurs and overcomes the system's ability to dissipate the heat, the normal zone will propagate and grow larger, causing a catastrophic condition which can result in severe damage to the inductor or magnet as even more energy is dissipated in portions of the inductor or magnet. This runaway condition can result in the uncontrolled dumping of the entire magnetic energy of the inductor or magnet causing damage to itself and possibly to the load. It could also result in a service outage of the inductor or magnet which could be intolerable if the inductor or magnet where part of a device having a critical military application. Early detection of a quench, however, permits the energy stored in the magnet or inductor to be dissipated in a controlled fashion. The energy can be dissipated in a variety of ways such as through dump resistors or by making the entire magnet or inductor go normal in a controlled fashion. Catastrophic damage due to overheating is therefore avoided.

Generally, a superconducting inductor is any current path composed of a superconducting material since any current path has a self-inductance. Superconducting inductors, and especially superconducting energy storage inductors, are generally configured as coils called solenoids or toroids. Superconducting magnets, which are a special case of superconducting inductors, often have more complex shapes, so as to appropriately shape the magnetic field they produce.

Several techniques exist for detecting and locating normal regions in a superconducting magnet or inductor. The principle technique involves the use of a series of voltage taps. Voltages are measured by voltmeters at various points along the coil of the superconducting material, with the objective of correlating changes in voltage caused by the change in resistivity due to the creation of a normal region. A severe drawback with using voltage taps is that in addition to the resistive voltage associated with a normal zone, a superconducting inductor produces inductive voltages resulting from the charging and discharging of the coil. These "common mode" inductive voltages are variable and change with any changes in the magnetic field. Also, since normal zones must be detected when they are small, the resistive voltage resulting from a quench is very small, typically 10-20 volts; whereas the common mode inductive voltage between two voltage taps is typically much larger and can be tens of kilovolts. If voltage taps are used, some technique must be utilized to eliminate the inductive voltage from the voltage measured at the taps. Typically, this involves subtracting out the inductive voltage by comparing the signal to a reference voltage. In any event, the technique involves subtracting two voltage measurements, one entirely inductive and the other mostly inductive but also having a small resistive component, with the hope of recovering the small resistive component.

As mentioned above, the inductive voltage across the inductor's terminals may be tens of kilovolts during normal operation. This means the sensor must be floated at these high voltages. This places a severe constraint upon any electronic components attached to the voltage taps to measure and detect a quench since these components must be designed to operate at these high inductive voltages. Also, since the components must be placed close to the voltage taps, they must be capable of operating properly at cryogenic temperatures and in high magnetic fields.

Often, numerous voltage taps are used to locate a normal zone. Typically, the taps are placed between turns of the inductor coil. Resolution, however, is limited to locating the normal zone between two voltage taps. Thus, the relative position of the normal zone between the two voltage taps cannot be determined. It would be desirable to be able to pinpoint within a turn where the normal zone occurs, especially since a turn of a coil in a superconducting inductor or magnet for large energy storage can have a diameter of between 600 and 1000 feet.

Another technique for the detector of quenches has been proposed for cable-in-conduit conductors. See L. Dresner, "Quench Detection By Fluid Dynamic Means In Cable-In-Conduit Superconductors" published in 1988 by Plenum Publishing Corp. of New York, N.Y., in the Proceedings of the 1987 Cryogenic Engineering Conference, Vol. 33, at pages 167-174 thereof. A cable-in-conduit conductor is one in which the superconducting conductor is sheathed in a conduit through which a coolant flows. In contrast, a pool cooled conductor sits in a pool of coolant. When a normal zone occurs in a cable-in-conduit conductor, the coolant in contact with the normal zone is heated. As the coolant is heated, a pressure pulse is transmitted along the conduit and is detected at the coolant source or sink of the conduit. This technique has limitations in that it only applies to superconducting inductors which utilize cable-in-conduit conductors There are also difficulties in measuring the pressure pulse since the conduit is a dynamic fluid system. Pressure changes resulting from conditions independent of the creation of a normal zone, such as source pressure, must be taken into account. Moreover, the resolution of this technique is limited in that the relative position of the normal zone along the superconductinq inductor cannot be determined.

It would be desirable, therefore, to develop a sensor for quench detection and location in superconductors under operating and quiescent conditions wherein not only can a quench easily be detected without encountering the difficulties mentioned above, but the exact location of the quench can also be determined.

SUMMARY OF THE INVENTION

Generally, the present invention relates to a hydraulic sensor for quench detection and location in a superconductor. The hydraulic sensor comprises a sealed tube adjacent to a superconductor wherein a normal zone may occur. Within the sealed tube is a working fluid, such as helium, which has a significantly changing vapor pressure over the temperature range of interest. A means for providing a working fluid to the tube can also be provided. Preferably, a pressure sensor for detecting a change in the vapor pressure of the working fluid is located at each end of the tube and a calculating circuit is connected to each pressure sensor for determining the location of the quench in the superconductor based on the difference in time between when each pressure sensor is activated.

During the normal operation of the superconductor, both the superconductor and the adjacent hydraulic quench detection sensor are at the same temperature. When a quench occurs in the superconductor, heat from the quench is rapidly transferred by conduction to the sensor tube. As the temperature within the tube rises, the vapor pressure of the working fluid changes The pressure change is transmitted along the tube at the speed of sound in the working fluid. The pressure change reaches the ends of the tube at different times where it is detected by the pressure sensors.

Preferably, the superconductor is in the form of a coil such as is found in an inductor or magnet. In that case, the sealed tube is co-wound with the coil to provide the maximum contact possible between the tube and the coil to facilitate heat transmission.

The co-wound hydraulic quench detection sensor can be operated in two different modes. In the first mode, a single pressure sensor located anywhere along the tube can be used to simply detect if a quench has occurred at any point in the tube. A second pressure is not necessary for this task, but could be used to verify the reading from the first sensor. Preferably, however, two pressure sensors, one at each end of the tube, are used which enables the relative position of the quench initiation area to be determined. Using a simple calculation, the quench initiation area can be determined from the difference in the times of arrival of the pressure pulse at the pressure sensors at each end of the tube.

Additionally, the hydraulic sensor of the present invention is readily amenable to sensor diagnostics for the detection of failure in the sensor itself. Other details, objects and advantages of the present invention will become more readily apparent from the following description of a presently preferred embodiment thereof.

BRIEF DESCRIPTION OF THE DRAWING

In the accompanying drawing, a preferred embodiment of the present invention is illustrated, by way of example only, wherein:

FIG. 1 shows a diagram of a hydraulic sensor of the present invention.

DESCRIPTION OF THE PREFERRED EMBODIMENT

As shown in FIG. 1, the hydraulic sensor of the present invention is composed of a tube 1 co-wound with a superconducting conductor 2 in the form of an inductor or magnet. Within the tube is a working fluid 3 such as superfluid helium which changes pressure significantly over the temperature range of interest. Other working fluids can also be used, such as liquid hydrogen, liquid nitrogen or liquid helium, depending upon the temperature range of interest. Preferably the working fluid in tube 1 is chosen to be the same as the supercooled coolant which is used to cool superconductor 2.

Each end 4 and 5 of the tube 1 is sealed. The tube 1 is pressurized (or depressurized) to be at a different pressure than the ambient pressure surrounding it during normal operation. Pressure detectors 6 and 7 are located at each tube end 4 and 5, respectively. The tube 1 must be constructed of a material strong enough to withstand pressurization and the changes in pressure which occur in the working fluid.

During normal operation, both the superconducting conductor 2 and the co-wound hydraulic quench detection sensor are at the temperature of the supercooled coolant used to cool the superconducting conductor 2. When a quench occurs in the conductor 2, heat is rapidly transferred to the tube 1 of the sensor. The temperature within the tube 1 quickly rises causing the vapor pressure in the working fluid 3 to change quickly. The vapor pressure change is transmitted along the tube 1 at the speed of sound in the working fluid 3. The pressure change reaches the ends 4 and 5 of the tube 1, where it is detected by the pressure sensors 6 and 7, respectively.

As mentioned before, the hydraulic quench detection sensor can be operated in two different modes. In the first mode, a single pressure sensor 8 can be used simply to detect if a quench occurs at any point along the tube 1. This sensor 8 can be located anywhere along the tube or it can be located at tube end 4 or 5. If one Pressure sensor 6 is located at tube end 4, a second pressure detector 7 located at the other tube end 5 can be used to confirm the reading from pressure sensor 6.

In a second mode of operation, the hydraulic sensor in addition to detecting the existence of a quench can also determine the location of the quench. By measuring the difference between the arrival times at which the pressure change reaches each end 4 and 5 of the sensor tube 1, the location of the quench initiation region can be calculated by a calculating circuit 9 using the difference between the arrival times plus other known parameters as shown below.

The position that the quench initiation region is from the end at which the pressure signal arrives at first, is a distance:

$$\text{length}_1 = \tfrac{1}{2}(\text{length} - v\Delta t) \tag{1}$$

where "$\Delta t$" is the difference in the arrival times of the pressure signal at the two ends 4 and 5 of the tube 1, "v" is the velocity of sound in the working fluid in the hydraulic sensor at normal operating conditions, and "length" is the full length of the tube 1 from one end to the other. Similarly, the position that the quench initiation region is from the end at which the pressure signal arrives last, is a distance:

$$\text{length}_2 = \tfrac{1}{2}(\text{length} + v\Delta t) \tag{2}$$

The calculating circuit 9 which measures $\Delta t$ and calculates $\text{length}_1$ and $\text{length}_2$ can be as simple or as complex as the situation requires. In one embodiment, the calculating circuit comprises a clock and a counter. Upon receiving a signal from the first pressure sensor 6, the counter is activated and begins counting clock pulses. The signal from the second pressure sensor 7 is used to turn off the counter with the result that the value in the counter represents Δt. The calculating means can also be designed to implement equations (1) and (2) so that the position of the quench initiation zone is determined.

An advantage of the present invention is that the operation of the hydraulic sensor is invariant to ambient magnetic fields. This is an important consideration, as the magnetic field of energy storage inductors varies considerably over time and can be quite large. Preferably, the sensor tube 1 is composed of a nonconducting material such as a composite to electrically isolate it from the superconductor.

Another advantage of the hydraulic sensor of the present invention is that it lends itself very easily to sensor diagnostics (i.e. techniques to determine if the sensor is operating properly or has failed) in a number of ways. First, the hydraulic sensor preferably utilizes two pressure sensors 6 and 7 operating in tandem. Although the two sensors 6 and 7 react at different times to pertubations in the tube 1, they both do react. The outputs of the two sensors should track one another, except for time delays imposed by the finite speed of sound in the working fluid. Therefore, the two pressure sensors 6 and 7 can act as a voting pair. If the sensors 6 and 7 do not track one another, this indicates that one has failed.

Another sensor diagnostic technique is based on the fact that the hydraulic sensor tube 1 is sealed and separate from the superconducting system coolant. When initially charged and sealed, the amount of working fluid in the hydraulic sensor can be chosen so that at all operating temperatures the hydraulic sensor has a different internal pressure than the surrounding ambient conditions. If the pressure of the hydraulic sensor changes to match ambient conditions, then the hydraulic sensor has developed a leak. Additionally, a test circuit can be included in the hydraulic sensor by inserting a small resistive heater at a known position along the hydraulic sensor tube 1. A current passing through the resistor produces joule heating, which should activate the pressure sensors 6 and 7 thereby providing a simple method for testing the hydraulic sensor.

The hydraulic sensor can be charged with the working fluid 3 in several ways. First, at the time of manufacture, a fixed amount of working fluid can be inserted into the tube 1 before it is sealed. Alternatively, the sensor can have working fluid supply and sink valves 10 and 11, preferably near the ends 4 and 6, of the tube 1. After the tube 1 is in place adjacent to superconductor 2, the tube 1 is filled with the working fluid from supply reservoir 12 and then sealed by the valves 10 and 11. This second technique requires more frequent maintenance, but should result in a longer useful life for the hydraulic sensor. The hydraulic sensor must be capable of surviving the total temperature range of the superconductor 2, which can vary from near absolute zero (0° K.) to above room temperature (273° K.), even though its operating temperature range may be much smaller. If the hydraulic sensor is operated at near atmospheric pressure at its operating temperature (which is near 0° K.), then its pressure will be large at room temperature. This requires a strong walled tube If, however, the hydraulic sensor is rechargeable through valves 10 and 11, then a pressure release valve can be used to avoid high pressures in the tube 1 when the hydraulic sensor is warmed to room temperature. Valves 10 and 11 can also serve as the pressure release valve or an additional valve can be included.

Another advantage of the present invention is that the operation of the hydraulic sensor is independent of the current flowing in the superconducting inductor 2. Some quench detection schemes rely on an operating current flowing in superconductor 2 to assist in detecting a quench. Although superconductor 2 has the greatest risk of a quench occurring when the maximum current is flowing in it, quenches can also be initiated at low current levels due to conditions independent of the coil, such as refrigeration system leaks. If a quench occurs at a low current level, it may not be properly detected in a detection system which relies on the flow of an operating current in superconductor 2.

While a presently preferred embodiment of practicing the invention has been shown and described with particularity in connection with the accompanying drawings, the invention may otherwise be embodied within the scope of the following claims.

What is claimed is:

1. A sensor for detecting a quench initiation region of quench occurring in a superconductor comprising: a sealed tube capable of being placed in proximity to the superconductor such that thermal transfer can occur between the sealed tube and the superconductor; a working fluid located within the tube and having a significantly changing vapor pressure over a certain temperature range; a first pressure sensor at one end of the tube which detects a change in pressure of the working fluid caused by a change in temperature of the working fluid due to the occurrence of the quench in the superconductor; a second pressure sensor at the other end of the tube which detects the change in pressure of the working fluid caused by the quench in the superconductor; and a calculating circuit connected to both pressure sensors for determining a time difference between when the change in pressure of the working fluid is selected by the first pressure sensor and when the change in pressure of the working fluid is detected by the second pressure sensor and using the time difference to calculate the location of the quench initiation region.

2. The hydraulic sensor as described in claim 1 wherein the tube is co-wound adjacent with the superconductor.

3. The hydraulic sensor as described in claim 1 wherein the working fluid is selected from the group consisting of liquid helium, liquid hydrogen or liquid nitrogen.

4. The hydraulic sensor as described in claim 1 wherein the working fluid is superfluid helium.

5. The hydraulic sensor as described in claim 1 wherein the working fluid is sealed in the tube prior to being placed in proximity to the superconductor.

6. The hydraulic sensor as described in claim 1 wherein the working fluid is provided to the tube from a supply reservoir through a supply valve and is returned from the tube to the supply reservoir through a sink value.

7. The hydraulic sensor as described in claim wherein the tube is composed of a nonconducting material.

* * * * *